United States Patent
Ishikawa

(10) Patent No.: US 11,296,560 B2
(45) Date of Patent: Apr. 5, 2022

(54) MOTOR, COMPRESSOR, AND AIR CONDITIONER

(71) Applicant: Mitsubishi Electric Corporation, Tokyo (JP)

(72) Inventor: Atsushi Ishikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 205 days.

(21) Appl. No.: 16/492,374

(22) PCT Filed: May 25, 2017

(86) PCT No.: PCT/JP2017/019557
§ 371 (c)(1),
(2) Date: Sep. 9, 2019

(87) PCT Pub. No.: WO2018/216168
PCT Pub. Date: Nov. 29, 2018

(65) Prior Publication Data
US 2020/0303974 A1    Sep. 24, 2020

(51) Int. Cl.
*H02K 1/16* (2006.01)
*H02K 3/02* (2006.01)
(Continued)

(52) U.S. Cl.
CPC ......... *H02K 1/165* (2013.01); *F04C 29/0085* (2013.01); *F25B 31/026* (2013.01); *H02K 3/02* (2013.01); *H02K 2213/03* (2013.01)

(58) Field of Classification Search
CPC    H02K 1/12; H02K 1/16; H02K 1/165; H02K 1/18; H02K 1/185; H02K 1/20;
(Continued)

(56) References Cited

U.S. PATENT DOCUMENTS 6,140,735 A * 10/2000 Kato ............... H02K 1/16
310/201
6,189,322 B1 * 2/2001 Ishihara ............ C09K 5/041
62/114
(Continued)

FOREIGN PATENT DOCUMENTS

CN    106533103 A    3/2017
JP    H08-078131 A    3/1996
(Continued)

OTHER PUBLICATIONS

Office Action dated Apr. 28, 2020 in the corresponding JP patent application No. 2019-519904 (with English translation).
(Continued)

*Primary Examiner* — Tran N Nguyen
(74) *Attorney, Agent, or Firm* — Posz Law Group, PLC

(57) ABSTRACT

A motor is used in a compressor. The motor includes a stator including a stator core having a yoke part that extends in a circumferential direction about an axis and a plurality of teeth that extend from the yoke part toward the axis and are arranged in the circumferential direction, and a winding wound around the plurality of teeth of the stator core in wave winding, and a rotor whose number of poles is P and which is disposed on an inner side of the stator in a radial direction about the axis. When a number of the plurality of teeth is represented by S, S/P≥6 is satisfied. The yoke part has a refrigerant passage through which refrigerant passes in a direction of the axis.

10 Claims, 17 Drawing Sheets

(51) Int. Cl.
*F04C 29/00* (2006.01)
*F25B 31/02* (2006.01)

(58) Field of Classification Search
CPC .. H02K 5/06; H02K 7/00; H02K 7/14; H02K 17/00; H02K 17/04; H02K 17/08; F04C 23/00; F04C 23/008; F04C 29/00; F04C 29/0085; F04C 18/34; F04C 18/35; F04C 18/356; F04C 18/3564; F25B 31/02; F25B 31/026
See application file for complete search history.

(56) References Cited

U.S. PATENT DOCUMENTS

| | | | | |
|---|---|---|---|---|
| 2009/0072655 | A1* | 3/2009 | Sano | H02K 1/185 |
| | | | | 310/216.016 |
| 2010/0117480 | A1 | 5/2010 | Ishizuka et al. | |
| 2011/0210639 | A1 | 9/2011 | Adaniya et al. | |
| 2012/0027632 | A1* | 2/2012 | Nemit, Jr. | F04C 28/26 |
| | | | | 417/440 |
| 2015/0263576 | A1 | 9/2015 | Kato | |
| 2016/0087495 | A1 | 3/2016 | Matsushita et al. | |
| 2018/0034332 | A1 | 2/2018 | Takahashi | |

FOREIGN PATENT DOCUMENTS

| | | | |
|---|---|---|---|
| JP | 2001-268824 | A | 9/2001 |
| JP | 2004-096907 | A | 3/2004 |
| JP | 2005-080451 | A | 3/2005 |
| JP | 2007-252018 | A | 9/2007 |
| JP | 2009-177971 | A | 8/2009 |
| JP | 2010-075011 | A | 4/2010 |
| JP | 2010-263744 | A | 11/2010 |
| JP | 2011-4518 | A | 1/2011 |
| JP | 2011-182522 | A | 9/2011 |
| JP | 2012-005180 | A | 1/2012 |
| JP | 2013-066341 | A | 4/2013 |
| JP | 2013-90479 | A | 5/2013 |
| JP | 2013-93956 | A | 5/2013 |
| JP | 2013-215056 | A | 10/2013 |
| JP | 5453770 | B2 | 3/2014 |
| JP | 2014-087100 | A | 5/2014 |
| JP | 2014-236577 | A | 12/2014 |
| JP | 2015-002650 | A | 1/2015 |
| JP | 2015-126628 | A | 7/2015 |
| JP | 2015-136195 | A | 7/2015 |
| JP | 2016-152712 | A | 8/2016 |
| JP | 2017-085837 | A | 5/2017 |

OTHER PUBLICATIONS

Extended European Search Report dated Apr. 22, 2020 in the corresponding EP patent application No. 17910746.1.
Office Action dated May 14, 2021 in corresponding CN application No. 201780089969.2 (and English Translation).
International Search Report ("ISR") dated Aug. 15, 2017 issued in corresponding international patent application No. PCT/JP2017/019557 (and English translation thereof).
Office Action dated Aug. 25, 2020 issued in corresponding JP patent application No. 2019-519904 (and English translation).
Reconsideration Report dated Jun. 15, 2021, issued in corresponding JP Patent Application No. 2019-519904 (and English Machine Translation).
Office Action dated Nov. 24, 2020 issued in corresponding CN patent application No. 201780089969.2 (and English machine translation).
Pyrhonen, Design of Rotating Electrical Machines (Chinese version), published 2016, p. 95-p. 100, by Beijing National Defense Industry Publishing Company, China (discussed in CN Office Action).
Office Action dated Feb. 9, 2021 issued in corresponding JP patent application No. 2019-519904 (and English machine translation).
Office Action dated May 28, 2021 in corresponding EP application No. 17910746.1.
Office Action dated Oct. 13, 2021 in connection with counterpart CN Patent Application No. 201780089969.2, and a machine English translation.

* cited by examiner

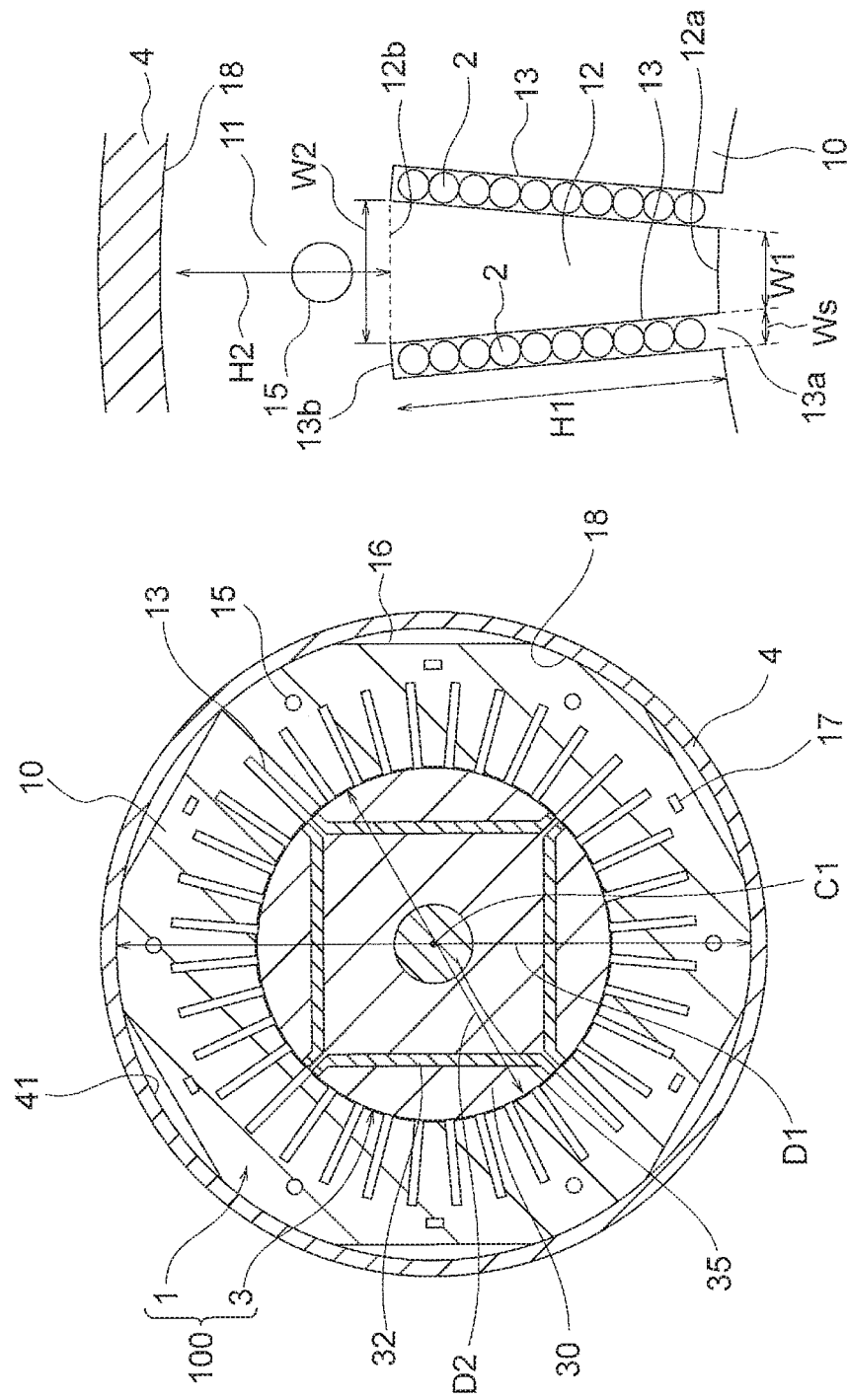

MOTOR, COMPRESSOR, AND AIR CONDITIONER

CROSS REFERENCE TO RELATED APPLICATION

This application is a U.S. national stage application of International Patent Application No. PCT/JP2017/019557 filed on May 25, 2017, the disclosure of which is incorporated herein by reference.

TECHNICAL FIELD

The present invention relates to a motor, a compressor, and an air conditioner.

BACKGROUND

Winding methods of a stator winding in a motor include concentrated winding and distributed winding. Distributed winding is often used in a motor used in an air conditioner and the like, since distributed winding is more advantageous in suppressing noise and vibration than concentrated winding.

Although concentric winding is often used among types of distributed winding, Patent References 1 and 2 disclose the use of wave winding with which coil end parts can be made smaller than concentric winding.

PATENT LITERATURE

Patent Reference 1: Japanese Patent Application Publication No. 2015-136195 (see FIG. 3)

Patent Reference 2: Japanese Patent Application Publication No. 2015-126628 (see FIGS. 1 to 3)

Meanwhile, when a motor is used in a compressor, it is necessary not only to suppress vibration and noise, but also to ensure a sufficient flow rate of refrigerant during an operation of the motor by providing a refrigerant passage inside the motor.

SUMMARY

The present invention is made to solve the above described problem, and an object of the present invention is to suppress vibration and noise and to increase a flow rate of refrigerant during an operation of a motor.

A motor of the present invention is a motor used in a compressor, and includes a stator including a stator core having a yoke part that extends in a circumferential direction about an axis and a plurality of teeth that extend from the yoke part toward the axis and are arranged in the circumferential direction, and a winding wound around the plurality of teeth of the stator core in wave winding, and a rotor whose number of poles is P and which is disposed on an inner side of the stator in a radial direction about the axis. When the number of the plurality of teeth is represented by S, $S/P \geq 6$ is satisfied. The yoke part has a refrigerant passage through which refrigerant passes in a direction of the axis.

In the present invention, the number of the teeth S and the number of the poles P satisfy $S/P \geq 6$. Therefore, it is possible to reduce harmonics of an induced voltage generated in the winding, and suppress vibration and noise. Moreover, since the winding is wound around the teeth in wave winding, an outward protruding amount of the winding in the radial direction is small. Therefore, a flow of refrigerant that passes through the refrigerant path provided in the yoke part is not obstructed by the winding, and thus a flow rate of the refrigerant can be increased.

BRIEF DESCRIPTION OF THE DRAWINGS

FIG. 4(A) is a schematic diagram for explaining dimensions of respective parts of the motor of the first embodiment, and FIG. 4(B) is an enlarged schematic diagram illustrating a tooth and its surrounding part.

DETAILED DESCRIPTION

First Embodiment (Configuration of Motor)

Figure 1:
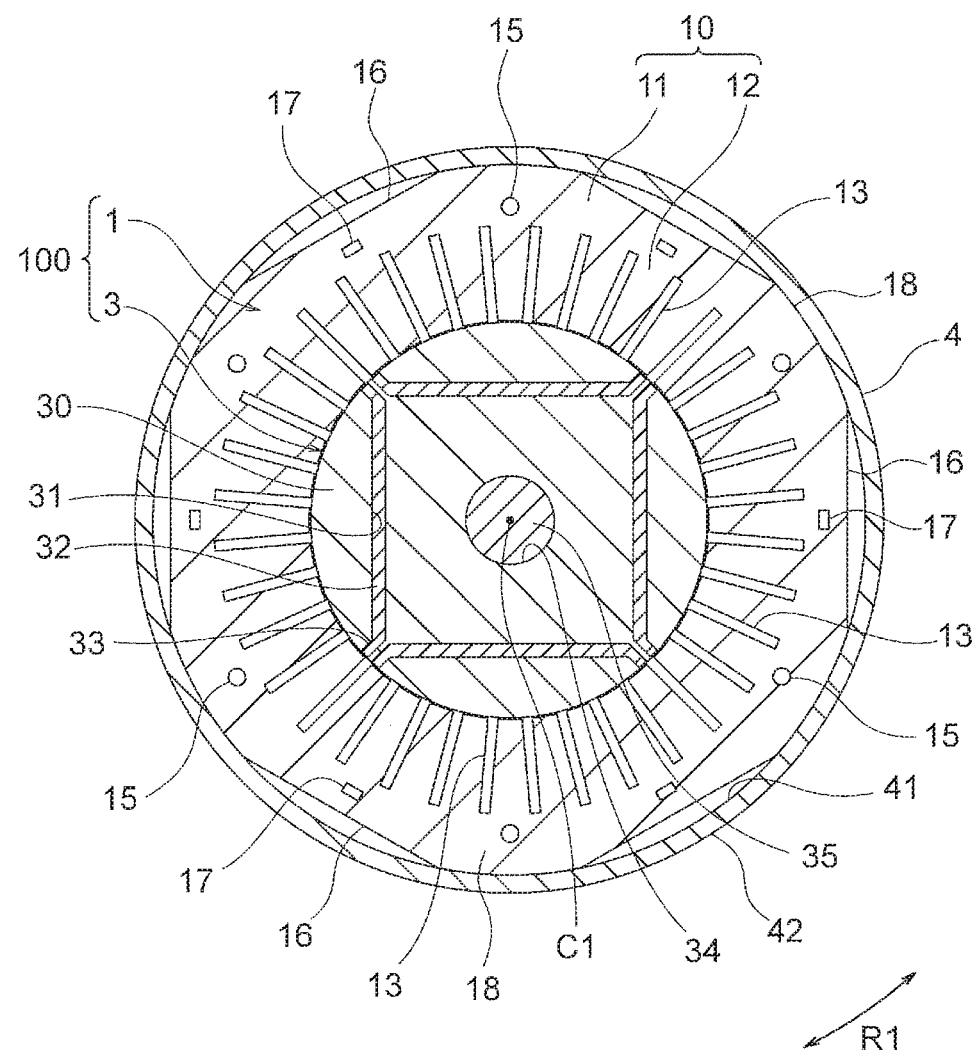
FIG. 1 is a sectional view illustrating a motor of a first embodiment.

FIG. 1 is a sectional view of a motor 100 of a first embodiment. This motor 100 is a brushless DC motor and is used in a compressor 500 (FIG. 19) described later. Moreover, this motor 100 is a permanent magnet embedded type motor having permanent magnets 32 embedded in a rotor 3.

The motor 100 includes a stator 1 and the rotor 3 rotatably provided on an inner side of the stator 1. An air gap is formed between the stator 1 and the rotor 3. The stator 1 is incorporated in a cylindrical shell 4 of the compressor 500.

The rotor 3 includes a cylindrical rotor core 30 and the permanent magnets 32 attached to the rotor core 30. The rotor core 30 is obtained by stacking a plurality of electromagnetic steel sheets each having a thickness of 0.1 to 0.7 mm, for example, in a direction of a rotation axis and fixing the sheets by crimping or the like. A circular shaft hole 34 is formed at a center of the rotor core 30 in a radial direction. A shaft 35 that is a rotation shaft is fixed to the shaft hole by press fitting. An axis C1 that is a center axis of the shaft 35 defines the rotation axis of the rotor 3.

Hereinafter, a direction of the axis C1 of the shaft 35 is referred to as an "axial direction". Moreover, a direction of a circumference about the axis C1 (indicated by an arrow R1 in FIG. 1) is referred to as a "circumferential direction". A direction of a radius about the axis C1 is referred to as a "radial direction".

A plurality of magnet insertion holes 31 are formed along an outer circumference of the rotor core 30, and arranged at equal intervals in the circumferential direction. In this example, the number of the magnet insertion holes 31 is four. The magnet insertion holes 31 pass through the rotor core 30 in the axial direction. Moreover, each magnet insertion hole 31 linearly extends along the outer circumference of the rotor core 30.

The permanent magnet 32 is disposed in the magnet insertion hole 31. The permanent magnet 32 is a member in the form of a flat plate, and has a length in the axial direction, a width in the circumferential direction, and a thickness in the radial direction. One permanent magnet 32 is disposed in each magnet insertion hole 31. However, a plurality of permanent magnets 32 may be disposed in each magnet insertion hole 31.

In this example, the number of poles P of the rotor 3 is four. However, the number of the poles P of the rotor 3 is not limited to four, and it is sufficient that the number of the poles P of the rotor 3 is two or more. Moreover, although one magnet insertion hole 31 and one permanent magnet 32 correspond to one magnetic pole in this example, a plurality of magnet insertion holes 31 may correspond to each magnetic pole, or a plurality of permanent magnets 32 may correspond to each magnetic pole.

A center of the magnet insertion hole 31 in the circumferential direction is a pole center. In this example, the magnet insertion hole 31 extends in a direction perpendicular to a line (also referred to as a magnetic-pole center line) in the radial direction which passes through the pole center. A part between the magnet insertion holes 31 adjacent to each other is an inter-pole part.

The permanent magnet 32 is formed of a rare earth sintered magnet containing neodymium (Nd), iron (Fe), boron (B), and dysprosium (Dy). Since the rare earth sintered magnet has a high residual magnetic flux density, a length of the rotor 3 in the axial direction required for obtaining a desired output can be shortened.

Each permanent magnet 32 is magnetized in such a manner that outer and inner sides thereof in the radial direction have mutually opposite magnetic poles. Moreover, the permanent magnets 32 adjacent to each other in the circumferential direction have mutually opposite magnetic poles facing the outer circumference side.

Flux barriers 33 are formed at both ends of the magnet insertion hole 31 in the circumferential direction. The flux barriers 33 are openings extending in the radial direction from the ends of the magnet insertion hole 31 in the circumferential direction toward the outer circumference of the rotor core 30. The flux barriers 33 are provided for suppressing leakage magnetic flux between the magnetic poles adjacent to each other (i.e., magnetic flux flowing through the inter-pole part).

(Configuration of Stator)

The stator 1 includes a stator core 10 and a winding 2 (FIG. 3) wound around the stator core 10 in wave winding. The stator core 10 is obtained by stacking a plurality of electromagnetic steel sheets each having a thickness of 0.1 to 0.7 mm, for example, in the axial direction and fixing the sheets by crimping parts 17.

The stator core 10 includes an annular yoke part 11 and a plurality of teeth 12 extending inward in the radial direction from the yoke part 11. In the example illustrated in FIG. 1, the number of the teeth 12 is thirty-six. A width (a length in the circumferential direction) of each tooth 12 decreases toward a tip of the tooth 12, that is, decreases inward in the radial direction.

A slot 13 is formed between each two teeth 12 adjacent to each other in the circumferential direction. The slots 13 are parts for accommodating the winding 2 wound around the teeth 12, and extend in the radial direction. The number of the slots 13 is the same as the number of the teeth 12, and is referred to as a slot number S. In the example illustrated in FIG. 1, the slot number S is thirty-six, and nine slots 13 correspond to each magnetic pole of the rotor 3.

In three-phase distributed winding, the slot number S is 3n (n is a natural number) times the pole number P. Therefore, a ratio S/P of the slot number S to the pole number P is 3, 6, 9, 12, and 15, for example. S/P may be also referred to as a ratio of the slot number S to the pole number P for the sake of simplicity.

Through holes 15 are formed in the stator core 10, and the through holes 15 pass through the stator core 10 in the axial direction. The through holes 15 are formed at a plurality of positions in the circumferential direction in the yoke part 11. In this example, six through holes 15 are arranged at equal intervals in the circumferential direction. The through holes 15 constitute refrigerant passages through which refrigerant passes in the axial direction. The through holes 15 are also referred to as wind holes since the through holes 15 are holes through which refrigerant gas passes. A cross-sectional shape of each through hole 15 is a circular shape in this example, but is not limited to the circular shape.

Figure 2:
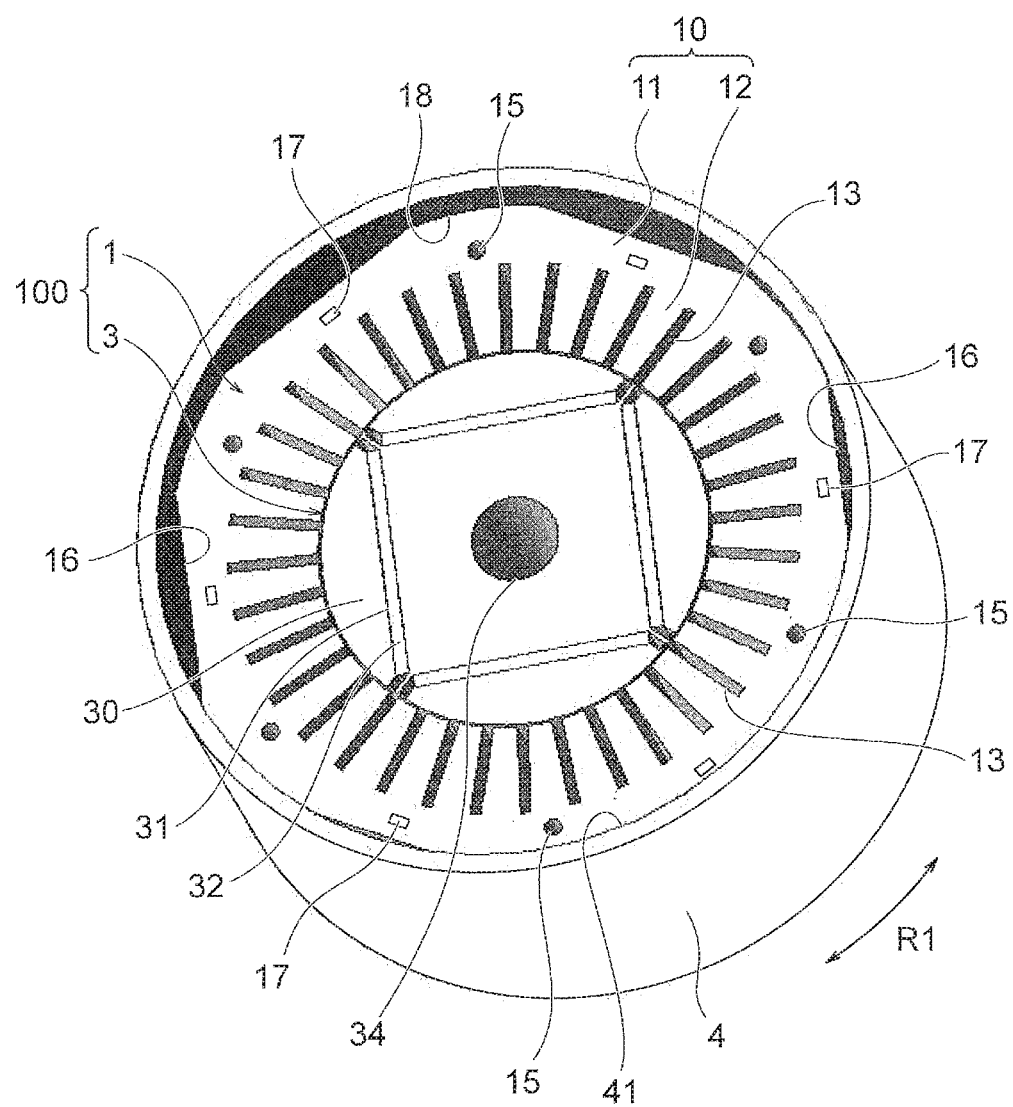
FIG. 2 is a perspective view illustrating the motor of the first embodiment in which no winding is wound.

FIG. 2 is a perspective view of the motor 100 in a state where the winding 2 is not wound around the stator core 10. As illustrated in FIG. 2, the yoke part 11 of the stator core 10 has a cylindrical outer circumferential surface 18 that is fitted to an inner circumferential surface 41 of the cylindrical shell 4.

Cutout parts 16 are formed on the outer circumferential surface 18 of the stator core 10. Each cutout part 16 is formed by cutting the cylindrical outer circumferential surface 18 by a plane parallel to the axis C1. In other words, the cutout part 16 has a shape such that an outer circumference of the yoke part 11 is linearly cut, in a plane perpendicular to the axis C1 (i.e., a shape of a chord).

The cutout parts 16 are formed at a plurality of positions in the circumferential direction in the yoke part 11. Six cutout parts 16 are arranged at equal intervals in the circumferential direction in this example. A refrigerant passage through which refrigerant passes in the axial direction is formed between each cutout part 16 and the inner circumferential surface 41 of the shell 4.

That is, the through holes 15 and the cutout parts 16 of the stator core 10 both constitute the refrigerant passages. Since the refrigerant passages (the through holes 15 and the cutout parts 16) are formed in the stator 1 as described above, refrigerant flows more easily as compared with a case where the refrigerant passages are formed in the rotor 3.

The number of the through holes 15 and the number of the cutout parts 16 are the same as each other (six in this example), and the through holes 15 and the cutout parts 16 are arranged alternately in the circumferential direction. That is, each through hole 15 is located between the cutout parts 16 adjacent to each other in the circumferential direction, and each cutout part 16 is located between the through holes 15 adjacent to each other in the circumferential direction. This configuration uniformizes a distribution of a flow rate of refrigerant in the circumferential direction.

Moreover, the crimping parts 17 for fixing the electromagnetic steel sheets of the stator core 10 to each other are formed in the yoke part 11. One reason is to prevent the crimping parts 17 from obstructing a flow of magnetic flux. Another reason is that, if the crimping parts 17 are formed in the teeth 12, an eddy current is generated due to a change with time of magnetic flux flowing through the teeth 12 since the crimping parts 17 allows current to easily flow in the axial direction. The crimping parts 17 are formed, for example, on the outer circumference side of the yoke part 11 at positions respectively corresponding to the centers of the cutout parts 16 in the circumferential direction.

Figure 3:
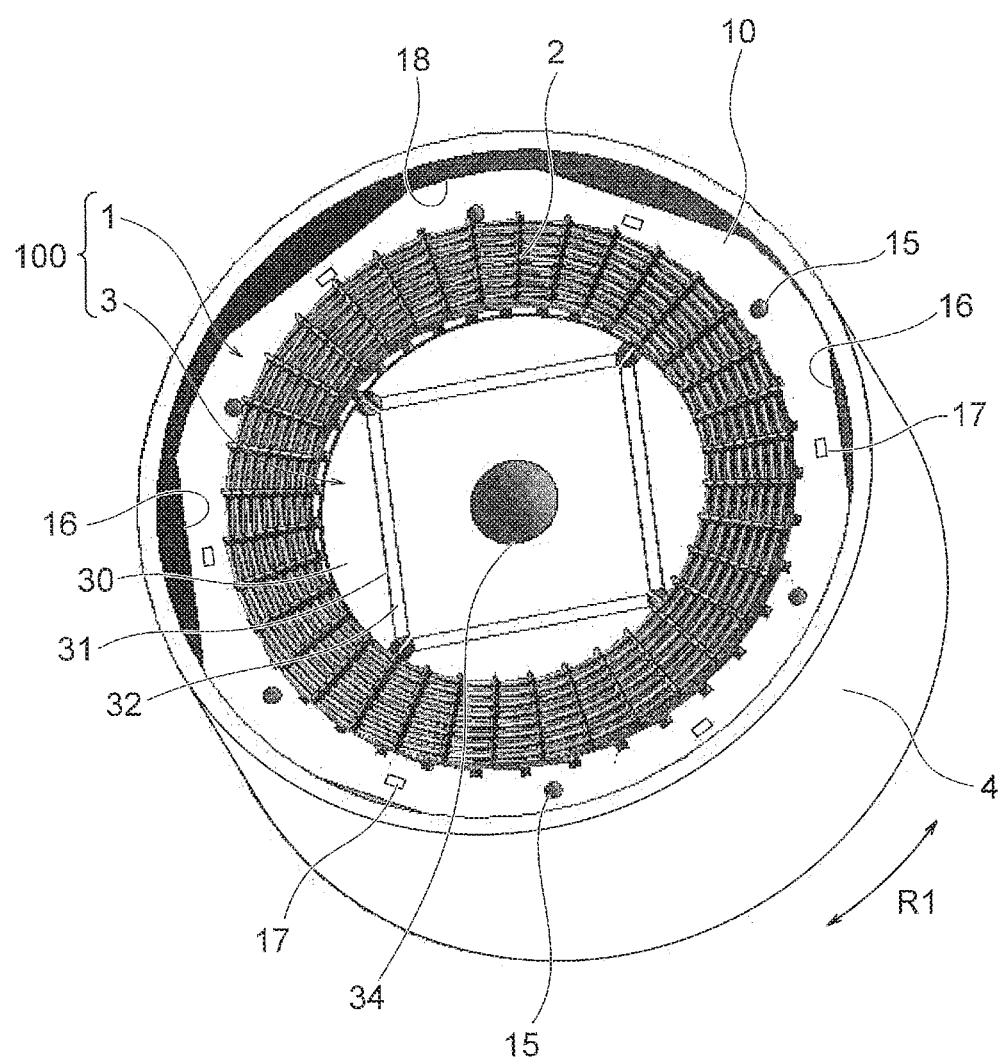
FIG. 3 is a perspective view illustrating the motor of the first embodiment in which a winding is wound.

FIG. 3 is a perspective view of the motor 100 in which the winding 2 is wound around the stator core 10. The winding 2 is wound around the thirty-six teeth 12 of the stator core 10 in wave winding. Since the winding 2 is wound in wave winding, an outward protruding amount of the winding 2 in the radial direction from the teeth 12 is small. Therefore, the winding 2 does not obstruct a flow of refrigerant passing through the through holes 15 and the cutout parts 16 serving as refrigerant passages.

Moreover, since the winding 2 is wound in wave winding, a protruding amount of the winding 2 in the axial direction from the stator core 10 is also small, as compared with a case where the winding 2 is wound in concentric winding. That is, in the entire length of the winding 2, the coil end parts that do not contribute to generation of driving force are small, and thus desired torque can be obtained at a lower current, so that motor efficiency is enhanced. Further, since the protruding amount of the winding 2 in the axial direction is small, a length of the motor 100 in the axial direction is short.

FIG. 4(A) is a schematic diagram for explaining dimensions of parts of the motor 100. A diameter of the stator 1, that is, a diameter D1 of the stator core 10 is set to such a length that the stator 1 can be fitted to the inner circumferential surface 41 of the shell 4. A diameter D2 of the rotor 3 (that is, a diameter of the rotor core 30) is 60 to 120 mm, for example.

FIG. 4(B) is an enlarged schematic diagram illustrating a part of the stator 1. As described above, the width of the tooth 12 decreases toward a tip 12a of the tooth 12. When the width of the tooth 12 at the tip 12a (an inner end in the radial direction) is represented by W1 and the width of the tooth 12 at its base 12b (an outer end in the radial direction) is represented by W2, W1<W2 is satisfied. An average of the widths W1 and W2 is referred to as an average width Wt of the tooth 12. That is, Wt=(W1+W2)/2. The average width Wt of the tooth 12 is a width of a magnetic path flowing in the tooth 12 in the radial direction, and is also referred to as a width Wt simply.

A length in the radial direction of the tooth 12 (that is, a distance from the base 12b to the tip 12a) is represented by H1. H1 is also a length of each slot 13. Moreover, a distance from the base 12b of the tooth 12 to the outer circumferential surface 18 of the yoke part 11 (a yoke width) is represented by H2. The yoke width H2 is a width of a magnetic path that flows in the yoke part 11 in the circumferential direction.

Winding parts of the winding 2 are arranged in a row in each slot 13. A width Ws in the circumferential direction of the slot 13 is set to such a width that the winding parts of the winding 2 are arranged in a row. That is, the slot 13 has a rectangular shape having the width Ws in the circumferential direction and the length H1 in the radial direction. An inner end of the slot 13 in the radial direction is an opening 13a through which the winding parts of the winding 2 are inserted, and an outer end of the slot 13 in the radial direction is a closed end 13b.

Figure 5A:
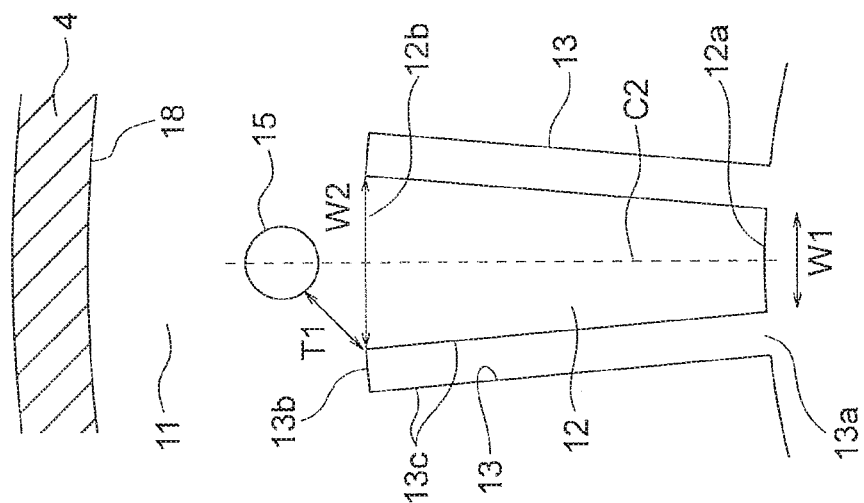
FIG. 5(A) is a schematic diagram illustrating a flow of magnetic flux in the tooth and a yoke of the first embodiment.

FIG. 5(A) is a schematic diagram illustrating a flow of magnetic flux in the tooth 12 and the yoke part 11. Magnetic flux from the permanent magnet 32 of the rotor 3 enters the tooth 12 through the tip 12a, flows in the tooth 12 outward in the radial direction, enters the yoke part 11 through the base 12b, and flows in the yoke part 11 to both sides in the circumferential direction.

Figure 5B:
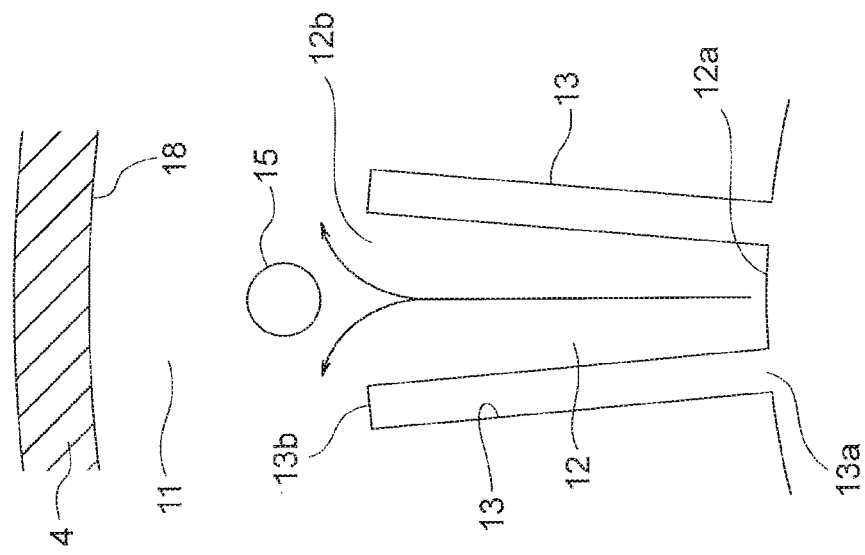
FIG. 5(B) is an enlarged schematic diagram illustrating the tooth and its surrounding part.

FIG. 5(B) is an enlarged schematic diagram illustrating the tooth 12, the slots 13, and the yoke part 11. The through hole 15 is formed at a position facing the base 12b of the tooth 12 in the yoke part 11. More specifically, the through hole 15 is formed on a line C2 in the radial direction which passes through the center of the tooth 12 in the circumferential direction. The shortest distance from the slot 13 to the through hole 15 is represented by T1.

The shortest distance T1 from the slot 13 to the through hole 15 is set to be longer than ½ of the average width Wt of the tooth 12. This is in order to reduce obstructing magnetic flux entering from the tooth 12 to the yoke part 11 as much as possible. Since the average width Wt of the tooth 12 is (W1+W2)/2, T1 is set to satisfy T1≥(W1+W2)/4.

(Configuration of Winding)

Next, the winding 2 will be described. The winding 2 is a conductor (for example, copper) to which a corrosion-resistant coating such as a coating of polyesterimide or polyamideimide is applied. This is because the winding 2 is in contact with refrigerant that circulates in the compressor 500 in which the motor 100 is provided.

Figure 6:
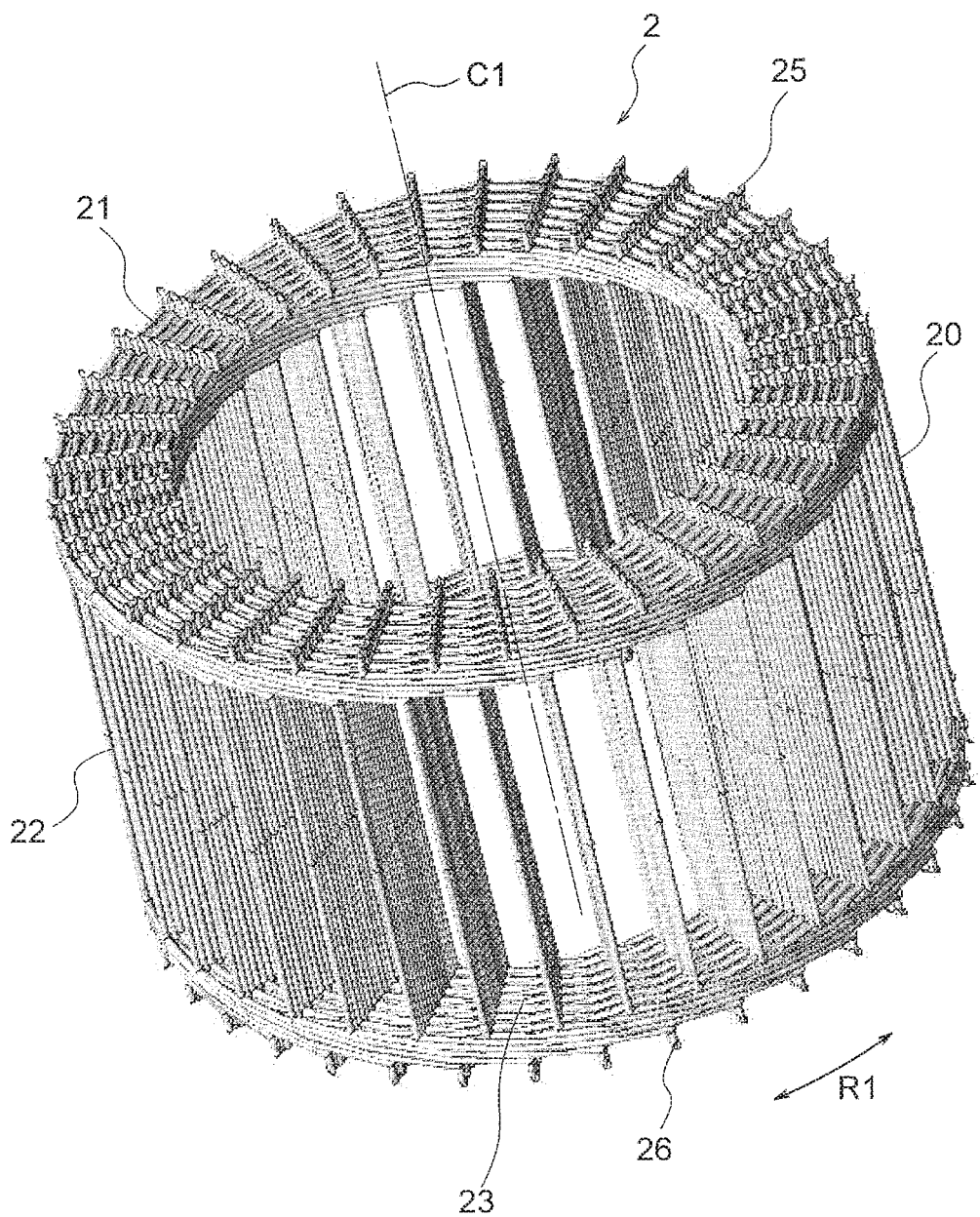
FIG. 6 is a perspective view illustrating the winding of the first embodiment.

FIG. 6 is a schematic diagram illustrating the winding 2 wound in wave winding. The winding 2 has a straight part 22 inserted in the slots 13 (FIG. 1), a coil end part 21 extending in the circumferential direction on one end surface of the rotor core 30 in the axial direction, and a coil end part 23 extending in the circumferential direction on the other end surface of the rotor core 30 in the axial direction. In this example, eight winding parts 20 of the winding 2 are inserted in each slot 13 (FIG. 1).

Figure 7:
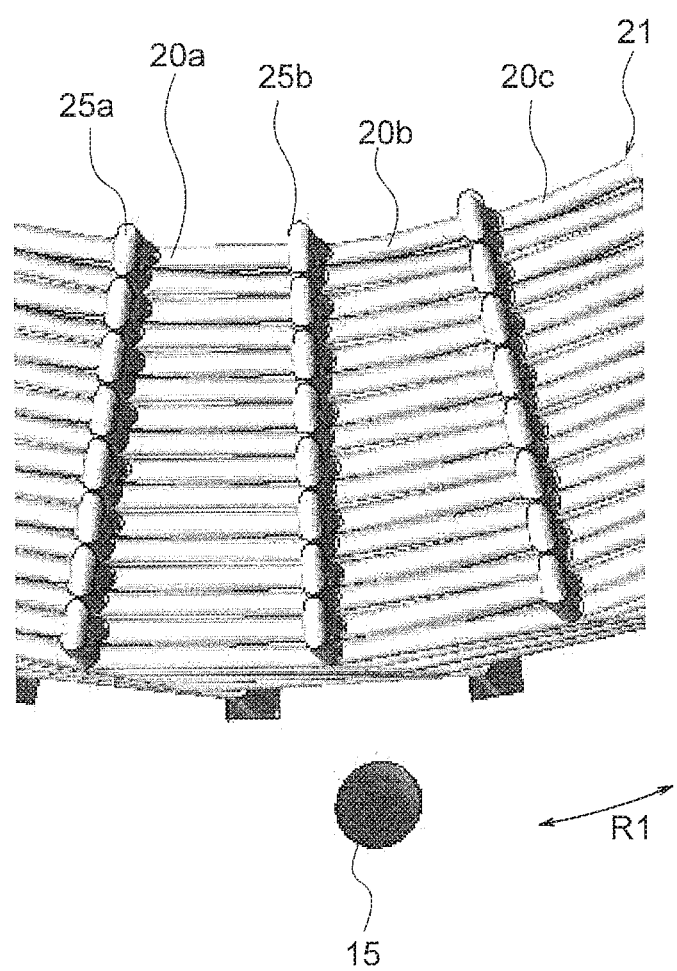
FIG. 7 is an enlarged schematic diagram illustrating a part of the winding of the first embodiment in an enlarged view.

FIG. 7 is an enlarged diagram illustrating a part of the coil end part 21 of the winding 2. In the coil end part 21, nine winding parts 20 are wound at the same winding position in the radial direction (for example, an innermost position) in such a manner that positions of the winding parts 20 in the circumferential direction are shifted from each other by one slot. Three of the nine winding parts 20 wound at the innermost position are referred to as winding parts 20a, 20b, and 20c.

Figure 8:
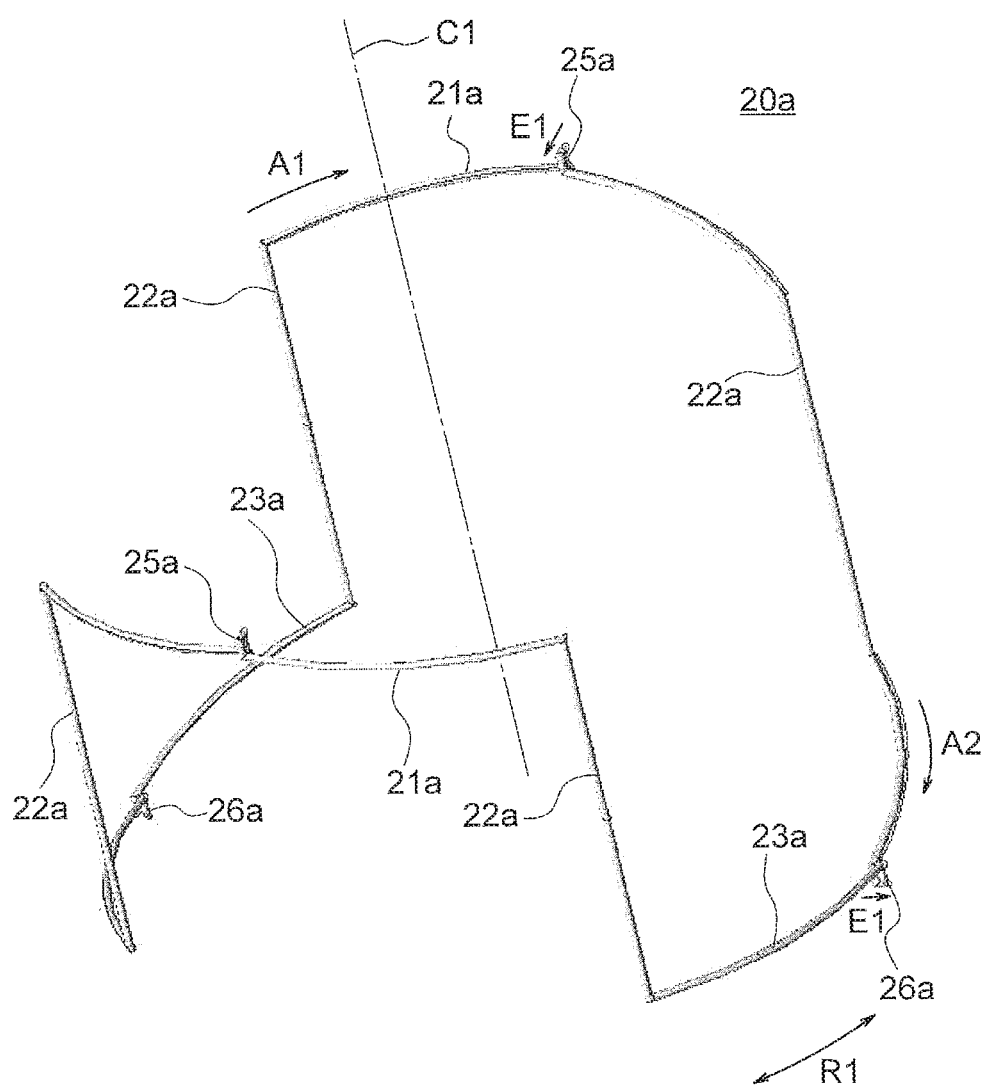
FIG. 8 is a perspective view illustrating one winding part of the winding of the first embodiment.

FIG. 8 is a schematic diagram illustrating one winding part 20a. The winding part 20a has two coil end parts 21a, four straight parts 22a, and two coil end parts 23a. The winding part 20a is wound so as to span nine teeth 12. That is, the straight parts 22a of the winding part 20a are inserted in every nine slots 13.

The coil end part 21a extends to connect ends of the straight parts 22a in the axial direction (upper ends in FIG. 8) to each other, and the coil end part 23a extends to connect the other ends of the straight parts 22a in the axial direction (lower ends in FIG. 8) to each other. The coil end parts 21a and the coil end parts 23a are alternately arranged in the circumferential direction about the axis C1.

A nose part 25a is provided at a center part of the coil end part 21a in the circumferential direction, and the coil end part 21a is displaced in the radial direction by a displacement amount E1 at the nose part 25a. The coil end part 21a extends clockwise in the circumferential direction about the axis C1 as indicated by an arrow A1 in FIG. 8, is displaced inward in the radial direction by the displacement amount E1 at the nose part 25a, and extends again in the direction indicated by the arrow A1.

A nose part 26a is provided at a center part of the coil end part 23a in the circumferential direction, and the coil end part 23a is displaced in the radial direction by the displacement amount E1 at the nose part 26a. The coil end part 23a extends clockwise in the circumferential direction about the axis C1 as indicated by an arrow A2 in FIG. 8, is displaced outward in the radial direction by the displacement amount E1 at the nose part 26a, and extends again in the direction indicated by the arrow A2.

Figure 9:
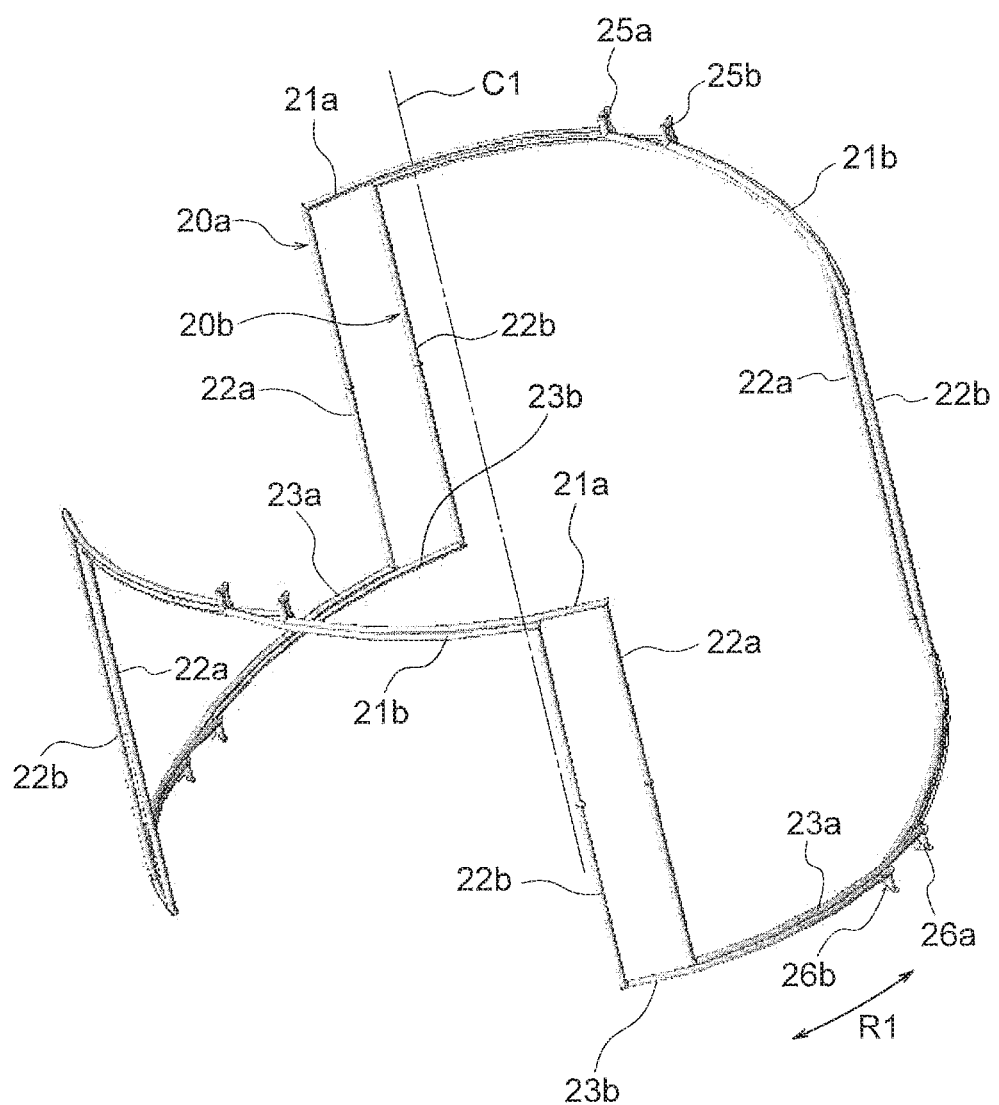
FIG. 9 is a perspective view illustrating two winding parts of the winding of the first embodiment.

FIG. 9 is a schematic diagram illustrating the two winding parts 20a and 20b. The winding part 20b has two coil end parts 21b, four straight parts 22b, and two coil end parts 23b, as is the case with the winding part 20a.

The straight part 22b of the winding part 20b is shifted clockwise about the axis C1 with respect to the straight part 22a of the winding part 20a by one slot. A nose part 25b is provided at a center part of the coil end part 21b in the circumferential direction, as is the case with the nose part 25a of the coil end part 21a. A nose part 26b is provided at a center part of the coil end part 23b in the circumferential direction, as is the case with the nose part 26a of the coil end part 23a.

The coil end parts 21a and 21b of the winding parts 20a and 20b extend in the circumferential direction while overlapping each other in the axial direction, and their vertical positions (positions in the axial direction) are inverted to each other through the nose parts 25a and 25b. Similarly, the coil end parts 23a and 23b of the winding parts 20a and 20b extend in the circumferential direction while overlapping each other in the axial direction, and their vertical positions (positions in the axial direction) are inverted to each other through the nose parts 26a and 26b. Therefore, the straight parts 22a and 22b of the winding parts 20a and 20b can be inserted in the slots 13 adjacent to each other (FIG. 1) without interfering with each other.

Although FIG. 9 illustrates the two winding parts 20a and 20b only, nine winding parts 20 in total including the winding parts 20a and 20b are wound at the same winding position (for example, at the innermost position) in the radial direction as the winding parts 20a and 20b. That is, the straight part 22 of the winding 2 is inserted in each of the thirty-six slots 13 of the stator core 10.

Figure 10:
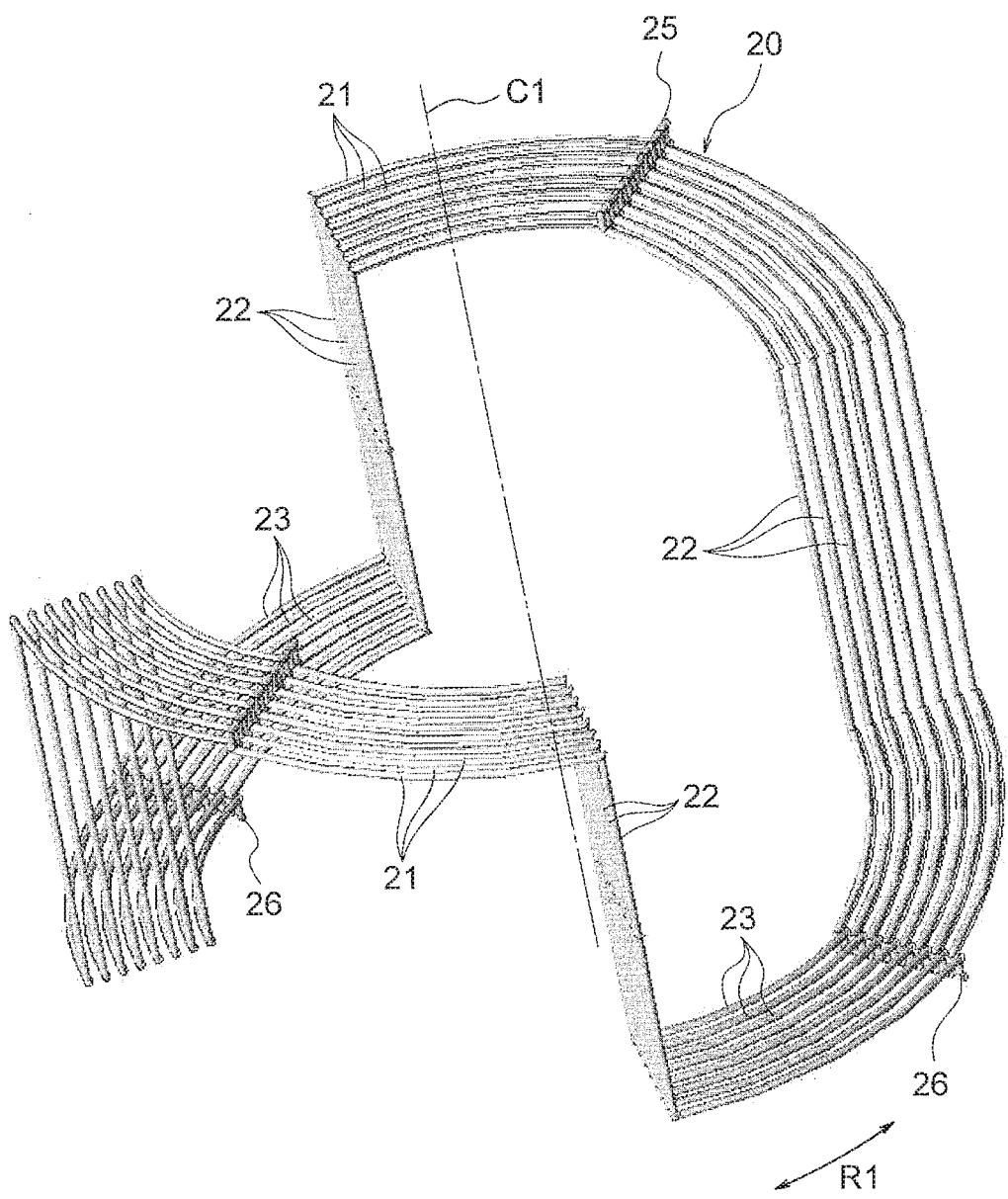
FIG. 10 is a perspective view illustrating winding parts inserted into the same slot of a stator of the first embodiment.

FIG. 10 is a schematic diagram illustrating eight winding parts 20 in total inserted in the same slots 13 in which the winding part 20a illustrated in FIG. 8 is inserted. The eight winding parts 20 are wound at equal intervals in the radial direction. By winding the winding parts 20 while shifting the winding parts 20 from each other by one slot in the circumferential direction (FIG. 9) and also winding the winding parts 20 in the radial direction as above, the winding 2 in wave winding illustrated in FIG. 6 is formed.

The number of the winding parts 20 inserted in each slot 13 and the number of the teeth 12 spanned by each winding part 20 are not limited to those in the example illustrated in FIGS. 6 to 10, and can be set to any numbers in accordance with the pole number P and the slot number S.

Comparative Example

Figure 11:
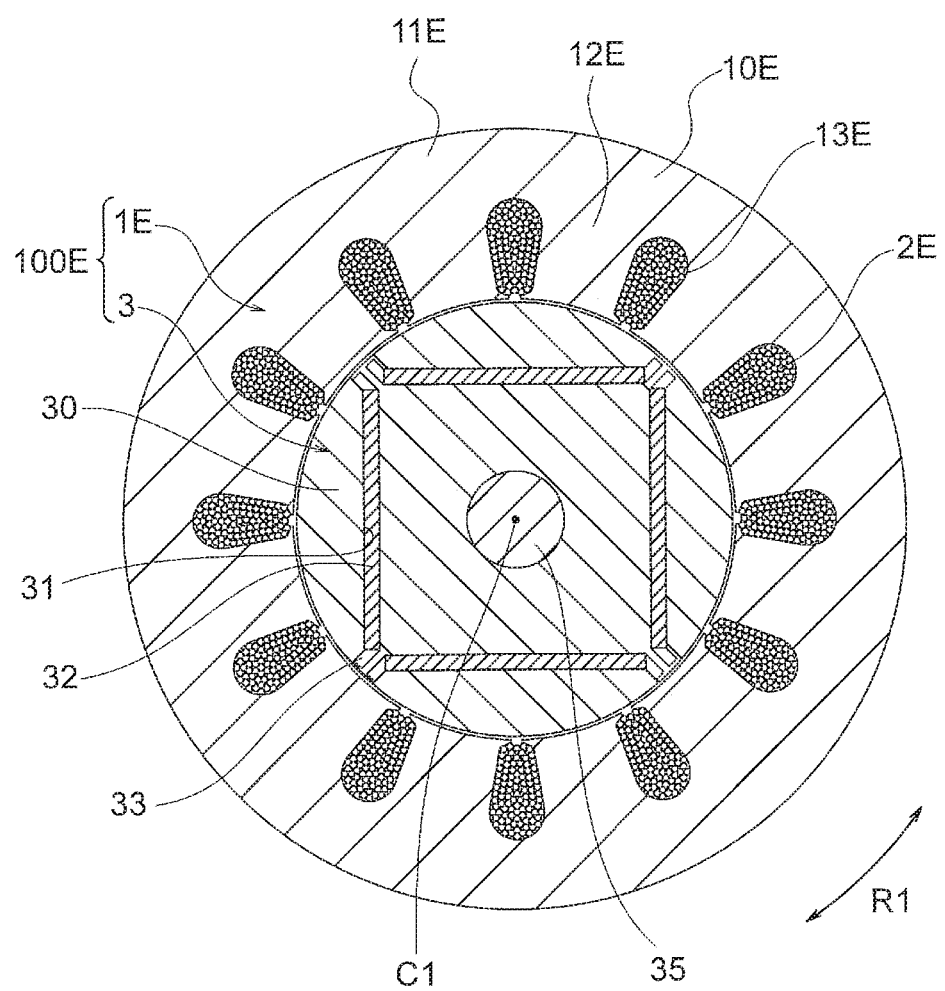
FIG. 11 is a sectional view illustrating a motor of a comparative example.

Next, a motor 100E of a comparative example will be described. FIG. 11 is a sectional view illustrating the motor 100E of the comparative example. The motor 100E of the comparative example includes a stator 1E and the rotor 3. The rotor 3 has the same configuration as the rotor 3 of the first embodiment. The stator 1E includes a stator core 10E and a winding 2E. The stator core 10E includes an annular yoke part 11E and twelve teeth 12 extending inward in the radial direction from the yoke part 11E. A slot 13E is formed between each two teeth 12E adjacent to each other in the circumferential direction.

In the motor 100E of the comparative example, the winding 2E is wound around the teeth 12E in concentric winding. The winding 2E wound in concentric winding largely protrudes outward in the radial direction from the teeth 12E. Therefore, even if through holes or the like through which refrigerant passes are formed in the yoke part 11E, a flow of the refrigerant is obstructed by the winding 2E. Moreover, the winding 2E wound in concentric winding largely protrudes in the axial direction from the stator core 10E, and thus sizes of coil end parts increase. That is, with respect to the entire length of the winding 2E, the lengths of the winding parts that do not contribute to generation of torque increase, and thus the motor efficiency is low.

(Effect of Reducing Harmonic Components of Induced Voltage)

Next, a preferable range of a ratio S/P of the slot number S to the pole number P will be described. First, a relation between S/P and an effect of reducing harmonic components of an induced voltage will be described.

When the rotor 3 rotates, a voltage (an induced voltage) is induced in the winding 2 of the stator 1 by a magnetic field of the permanent magnet 32. Whereas a fundamental wave component of the induced voltage contributes to generation of torque, harmonic components cause torque ripple and result in vibration and noise of the motor 100. Therefore, suppressing harmonic components of the induced voltage is an issue.

A fundamental wave component and harmonic components of an induced voltage can be evaluated by a winding factor. The winding factor is calculated by a product of a pitch factor Kp and a distribution factor Kd. The pitch factor Kp is calculated by the following Equation (1) on the basis of the order, the pole number P, the slot number S, and a coil throw (the number of teeth spanned by the winding 2).

$$Kp = \sin(\text{order} \times 180 \times \text{pole number/slot number} \times \text{coil throw}/2) \quad (1)$$

The distribution factor Kd is calculated by the following Equation (2) on the basis of a phase difference a in the winding.

$$Kd = \cos(\text{order} \times \alpha/2) \quad (2)$$

The phase difference a in the winding is obtained by the following Equation (3).

$$\alpha = 180 \times \text{pole number/slot number} \quad (3)$$

Figure 12:
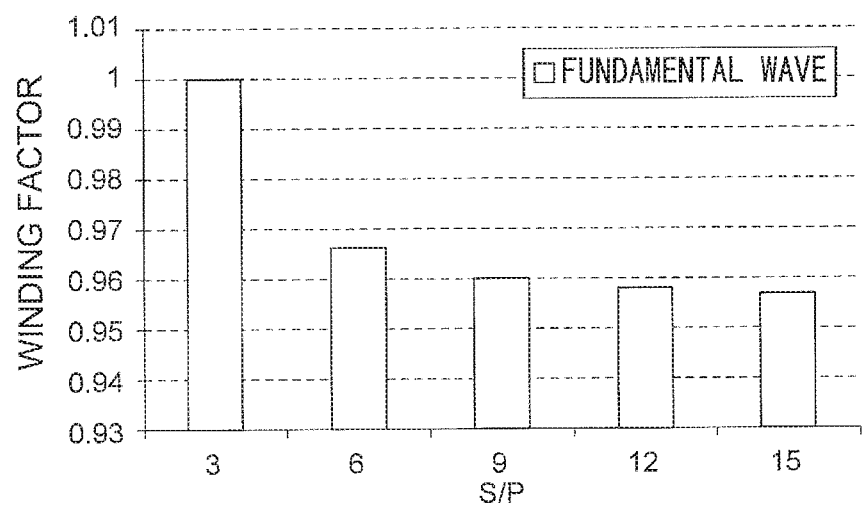
FIG. 12 is a graph illustrating a relation between a ratio S/P of a slot number S to a pole number P and a winding factor of a fundamental wave.
Figure 13:
FIG. 13 is a graph illustrating a relation between S/P and a winding factor of the third order.
Figure 14:
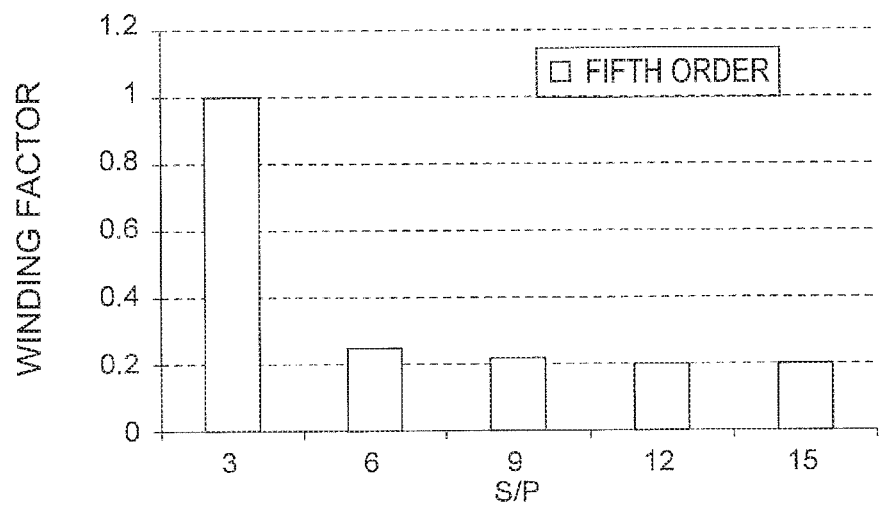
FIG. 14 is a graph illustrating a relation between S/P and a winding factor of the fifth order.

Winding factors of the fundamental wave, the third order harmonic, and the fifth order harmonic are obtained by changing the ratio S/P of the slot number S to the pole number P in the motor 100 illustrated in FIG. 1. FIG. 12 is a graph illustrating a relation between S/P and the winding factor of the fundamental wave. FIG. 13 is a graph illustrating a relation between S/P and the winding factor of the third order. FIG. 14 is a graph illustrating a relation between S/P and the winding factor of the fifth order. In FIGS. 12, 13, and 14, a value of S/P is changed to 3, 6, 9, 12, and 15.

The winding factor of the fundamental wave (first order) is 1 when S/P is 3, and gradually decreases to 0.95 to 0.96 as S/P increases to 6, 9, 12, and 15, as illustrated in FIG. 12.

The winding factor of the third order is 1 when S/P is 3, decreases to 0.7 when S/P is 6, and decreases to 0.65 as S/P increases to 9, 12, and 15, as illustrated in FIG. 13.

The winding factor of the fifth order is 1 when S/P is 3, decreases to 0.25 when S/P is 6, and decreases to 0.2 as S/P increases to 9, 12, and 15, as illustrated in FIG. 14.

When S/P is 3, the winding factor of the fundamental wave is large, and thus magnetic flux interlinking the winding can be used to the full extent. This is advantageous in obtaining high torque. However, since the winding factors of the third order and the fifth order are also large, there is a possibility that harmonic components may be superimposed on an induced voltage, and vibration and noise of the motor 100 may occur.

On the other hand, when S/P is 6 or more, the winding factor of the fundamental wave is reduced. However, the winding factors of the third order and the fifth order are also reduced, and thus the harmonics of the induced voltage can be reduced, and vibration and noise of the motor 100 can be suppressed.

From this result, it is understood that when S/P is 6 or more (that is, S/P≥6), harmonics of an induced voltage can be reduced, and vibration and noise of the motor 100 can be suppressed.

(Tooth Shape)

Next, a relation between S/P and a ratio W2/W1 of the width W2 of the base 12b of the tooth 12 to the width W1 of the tip 12a of the tooth 12 will be described. In the case of wave winding, the winding parts of the winding 2 are inserted in each slot 13 in a row as illustrated in FIG. 4(B). Thus, a shape (more specifically, a cross-sectional shape perpendicular to the axis C1) of the slot 13 is a rectangular shape. Therefore, a shape of the tooth 12 between the adjacent slots 13 is a trapezoidal shape.

When the shape of the tooth 12 is closer to a rectangle, a deviation of distribution of magnetic flux density in the tooth 12 can be suppressed, so that local magnetic saturation or local increase of iron loss in the tooth 12 can be suppressed. Therefore, when the ratio W2/W1 of the width W2 of the base 12b of the tooth 12 to the width W1 of the tip 12a is closer to 1, excellent magnetic properties are obtained.

Figure 15:
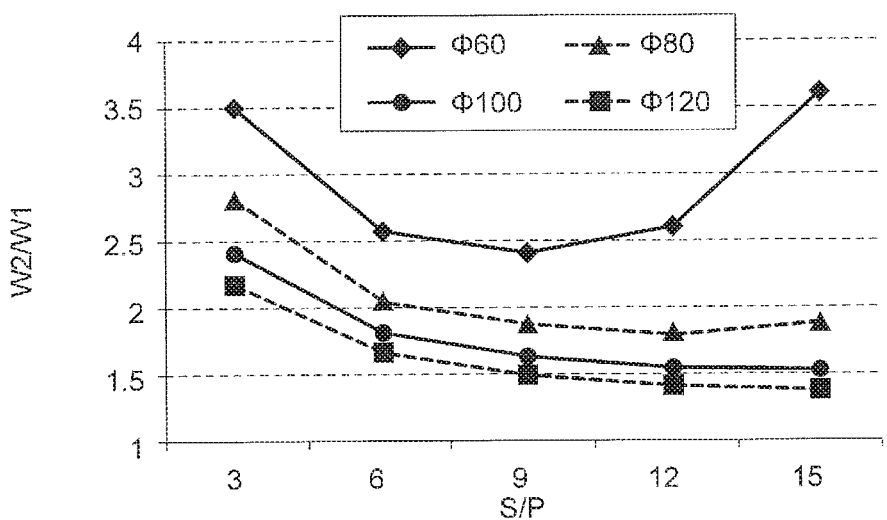
FIG. 15 is a graph illustrating a relation between S/P and a ratio W2/W1 of a width of a bottom of the tooth to a width of a tip of the tooth.

In a general motor for a compressor in which distributed winding (including wave winding) is used, a rotor has an outer diameter of 60 to 120 mm. Therefore, the outer diameter D2 of the rotor 3 is changed to 60, 80, 100, and 120 mm in this example. FIG. 15 is a graph illustrating a relation between S/P and W2/W1 when the outer diameter D2 of the rotor 3 is changed to 60, 80, 100, and 120 mm.

From FIG. 15, in the case where the outer diameter D2 of the rotor 3 is 80 to 120 mm, W2/W1 is the maximum when S/P is 3, and decreases to approach 1 as S/P increases to 6, 9, 12, and 15. When S/P is 12 or more, a rate of decrease of W2/W1 levels out.

Meanwhile, in the case where the outer diameter D2 of the rotor 3 is 60 mm, W2/W1 decreases as S/P increases to 3, 6 and 9. However, W2/W1 greatly increases when S/P increases from 12 to 15, and W2/W1 is the maximum when S/P is 15.

That is, when S/P is 15, the shape of the tooth 12 is greatly different from a rectangle in the case where the rotor 3 has a small diameter. Therefore, this S/P value is not desirable in terms of suppressing a deviation of distribution of magnetic flux density in the tooth 12.

From this result, it is understood that 6≤S/P≤12 is desirable in order to suppress a deviation of distribution of magnetic flux density in the tooth 12.

(Ratio of Tooth Width to Slot Width)

Next, a relation between S/P and a ratio (Wt/Ws) of the width Wt of the tooth 12 to the width Ws of the slot 13 will be described. The width Wt of the tooth 12 is (W1+W2)/2 as described above. If the width Wt of the tooth 12 is narrow, there is a possibility that magnetic saturation may occur in the tooth 12, and iron loss may increase. Thus, it is desirable that the width Wt of the tooth 12 is wide. In particular, it is desirable that the ratio Wt/Ws of the width Wt of the tooth 12 to the width Ws of the slot 13 is 1 or more.

Figure 16:
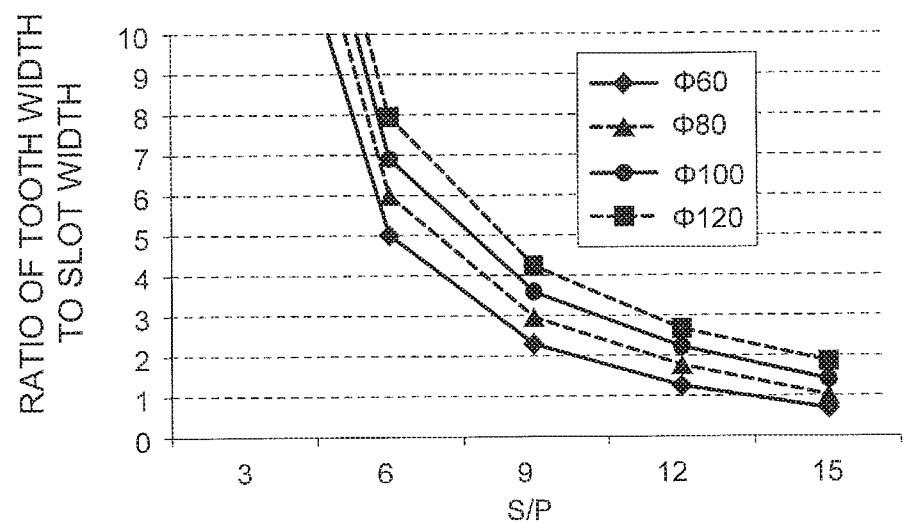
FIG. 16 is a graph illustrating a relation between S/P and a ratio of a tooth width to a slot width.

FIG. 16 is a graph illustrating a relation between S/P and Wt/Ws when the outer diameter D2 of the rotor 3 is changed to 60, 80, 100, and 120 mm. As illustrated in FIG. 16, Wt/Ws tends to decrease as S/P increases in all cases where the outer diameter D2 of the rotor 3 is 60, 80, 100, and 120 mm.

Moreover, when S/P is 15, Wt/Ws is smaller than 1 (in other words, the width Wt of the tooth 12 is narrower than the width Ws of the slot 13) in the case where the outer diameter D2 of the rotor 3 is 60 mm. Therefore, this S/P value is not desirable in terms of suppressing iron loss.

From this result, it is understood that 6≤S/P≤12 is desirable in order to suppress magnetic saturation in the tooth 12 to enhance iron loss.

If the width Ws of the slot 13 is too narrow with respect to the width Wt of the tooth 12, a wire diameter of the winding 2 decreases and thus density of current flowing through the winding 2 increases. When the current density increases, it is necessary to enhance heat-resisting property of the winding, and it leads to increase in manufacturing cost. Therefore, it is desirable that the width Wt of the tooth 12 is equal to or less than six times the width Ws of the slot 13. That is, 1≤Wt/Ws≤6 is desirable.

(Reduction of Copper Loss)

Figure 17:
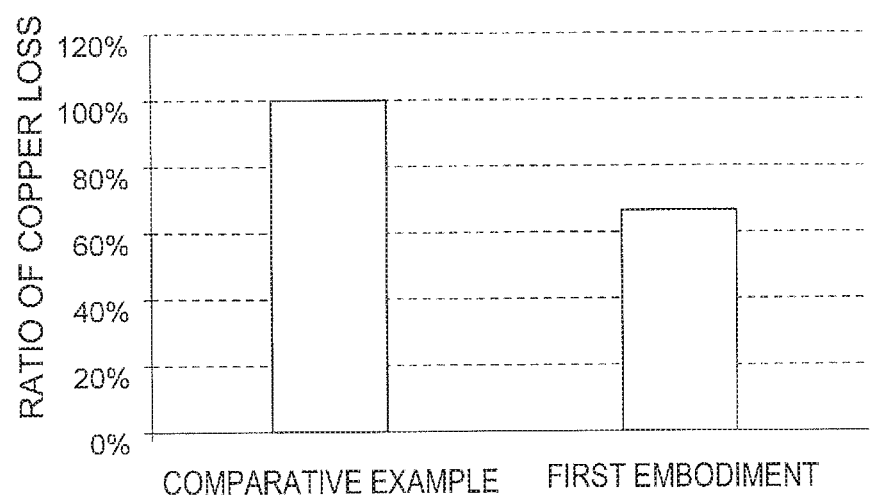
FIG. 17 is a graph illustrating copper loss in the first embodiment and copper loss in the comparative example in comparison.

Next, an effect of reducing copper loss obtained by winding the winding 2 by wave winding in the first embodiment will be described. FIG. 17 is a graph illustrating a result of comparison between copper loss in the motor 100E of the comparative example (FIG. 11) in which the winding 2 is wound in concentric winding and copper loss in the motor 100 of the first embodiment in which the winding 2 is wound in wave winding.

Here, how much copper loss in the motor 100 of the first embodiment is reduced is measured on the assumption that the copper loss in the motor 100E of the comparative example (FIG. 11) is 100%. As illustrated in FIG. 17, the copper loss in the first embodiment is 65.6% with respect to the motor 100E of the comparative example, and it is confirmed that the copper loss is reduced by 34.4%. This is because a circumferential length of the winding 2 is shorter in wave winding than in concentric winding.

Advantages of Embodiment

As described above, in the motor 100 of the first embodiment of the present invention, the winding 2 is wound around the teeth 12 of the stator 1 in wave winding, the slot number S and the pole number P satisfy S/P≥6, and the refrigerant passages (that is, the through holes 15 and the cutout parts 16) through which refrigerant flows in the axial direction are provided in the yoke part 11 of the stator core 10. Therefore, harmonics of an induced voltage generated in the winding 2 during rotation of the rotor 3 can be reduced, and thus vibration and noise of the motor 100 can be suppressed.

Moreover, since the winding 2 is wound around the teeth 12 in wave winding, the outward protruding amount of the winding 2 in the radial direction is small. Therefore, a flow of refrigerant that passes through the through holes 15 and the cutout parts 16 is not obstructed by the winding 2, and thus a sufficient flow rate of refrigerant can be obtained.

Further, since the winding 2 is wound around the teeth 12 in wave winding, the protruding amount of the winding 2 in the axial direction from the stator core 10 is also small. Therefore, the coil end parts can be made smaller to enhance the motor efficiency, and the size of the motor 100 can be reduced.

In particular, in a large apparatus such as an air conditioner for business use, the motor 100 that generates less vibration and less noise and that is small and lightweight is needed. The motor 100 of the first embodiment is suitable especially for this use.

In addition, since the slot number S and the pole number P satisfy 6≤S/P≤12, the shape of the tooth 12 can be made closer to a rectangle, and thus local magnetic saturation can be suppressed and iron loss can be reduced.

Moreover, the winding 2 is coated with polyesterimide or polyamideimide (corrosion-resistant material), and thus corrosion caused by refrigerant that circulates in the compressor 500 can be prevented.

Further, the rotor 3 includes the permanent magnets 32 formed of rare earth sintered magnets, and the rare earth sintered magnets have high residual magnetic flux density and high coercivity. Thus, the efficiency of the motor 100 can be enhanced, and demagnetization resistance can be enhanced.

In addition, since the crimping parts 17 are formed in the yoke part 11, the crimping parts 17 do not obstruct a flow of magnetic flux in the teeth 12, unlike the case where the crimping parts 17 are formed in the teeth 12. Thus, sufficient strength of the stator 1 can be obtained and the motor efficiency can be enhanced.

Moreover, since the stator 1 has the through holes 15 passing through the yoke part 11 in the direction of the axis C1, refrigerant easily flows through the through holes 15, and a flow rate of the refrigerant can be increased.

Further, the width W1 of the tip 12a of the tooth 12, the width W2 of the base 12b of the tooth 12, and the shortest distance T1 from the slot 13 to the through hole 15 satisfy T1≥(W1+W2)/4. Therefore, obstruction of magnetic flux flowing from the teeth 12 to the yoke part 11 can be reduced as much as possible and the motor efficiency can be further enhanced.

Furthermore, the stator 1 has the cutout part 16 formed on the outer circumference of the yoke part 11 over the entire region in the direction of the axis of the yoke part 11. Therefore, refrigerant easily flows between the cutout part 16 and the shell 4, and thus a flow rate of the refrigerant can be increased.

In addition, a plurality of the through holes 15 and a plurality of cutout parts 16 are provided, and the through holes and the cutout parts 16 are formed alternately in the circumferential direction. Thus, a distribution of the flow rate of refrigerant in the circumferential direction is uniformized.

Modifications

Next, modifications of the first embodiment will be described. FIGS. 18(A), 18(B), 18(C), and 18(D) are schematic diagrams illustrating motors 100A, 100B, 100C, and 100D of the modifications of the first embodiment.

In the aforementioned motor 100 of the first embodiment (FIG. 1), the stator 1 has both of the through holes 15 and the cutout parts 16. However, it is also possible to employ a configuration in which a stator 1A has the through holes 15 but does not have the cutout parts 16, as in the motor 100A illustrated in FIG. 18(A). In this case, the through holes 15 of the stator 1A constitute refrigerant passages through which refrigerant passes.

Figure 18A:
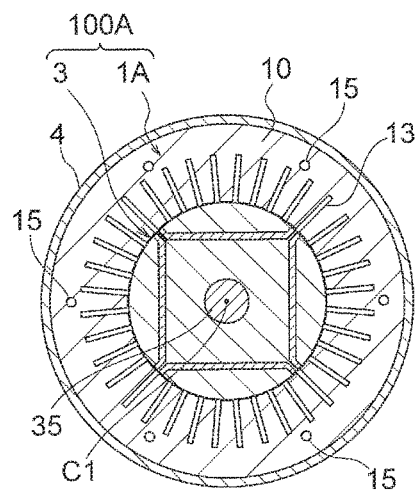
FIGS. 18(A), (B), (C), and (D) are sectional views illustrating motors of modifications of the first embodiment.
Figure 18B:
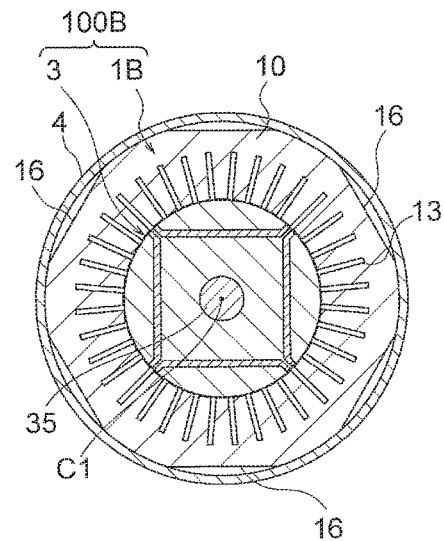
Figure 18C:
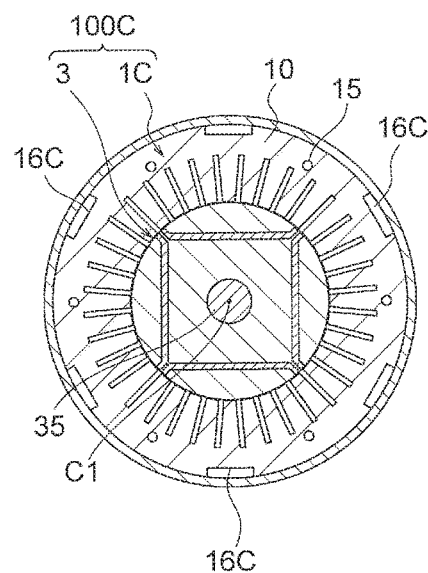

Moreover, it is also possible to employ a configuration in which a stator 1B has the cutout parts 16 but does not have through holes 15, as in the motor 100B illustrated in FIG. 18(B). In this case, the cutout parts 16 of the stator 1B constitute refrigerant passages through which refrigerant passes.

The aforementioned motor 100 of the first embodiment (FIG. 1) has the cutout parts 16 each obtained by cutting the outer cylindrical circumferential surface 18 of the stator 1 by a plane. Alternatively, grooves 16C each having a rectangular cross-sectional shape may be provided on the outer circumferential surface 18 of a stator 1C, as in the motor 100C illustrated in FIG. 18(C). In this case, the through holes 15 and the grooves 16C of the stator 1C constitute refrigerant passages through which refrigerant passes.

Figure 18D:
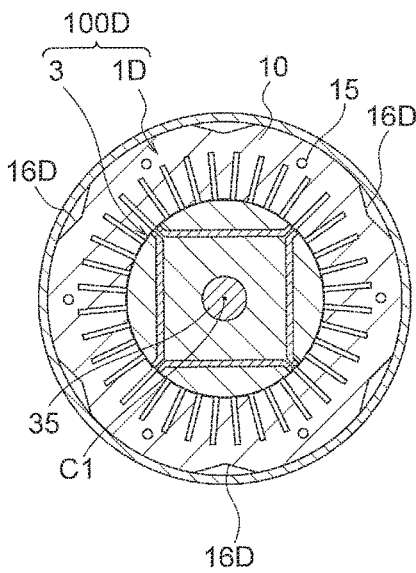

Alternatively, grooves 16D each having a V-shaped cross-section may be provided on the outer circumferential surface 18 of a stator 1D, as in the motor 100D illustrated in FIG. 18(D). In this case, the through holes 15 and the grooves 16D of the stator 1D constitute refrigerant passages through which refrigerant passes. Moreover, each of the motors 100C and 100D in FIGS. 18(C) and 18(D) can be configured not to include the through holes 15.

In the aforementioned first embodiment and the modifications, the number of the through holes 15 and the number of the cutout parts 16 can be set to any numbers. That is, it is sufficient that the yoke part 11 of the stator 1 has at least one through hole 15 or at least one cutout part 16.

(Compressor)

Figure 19:
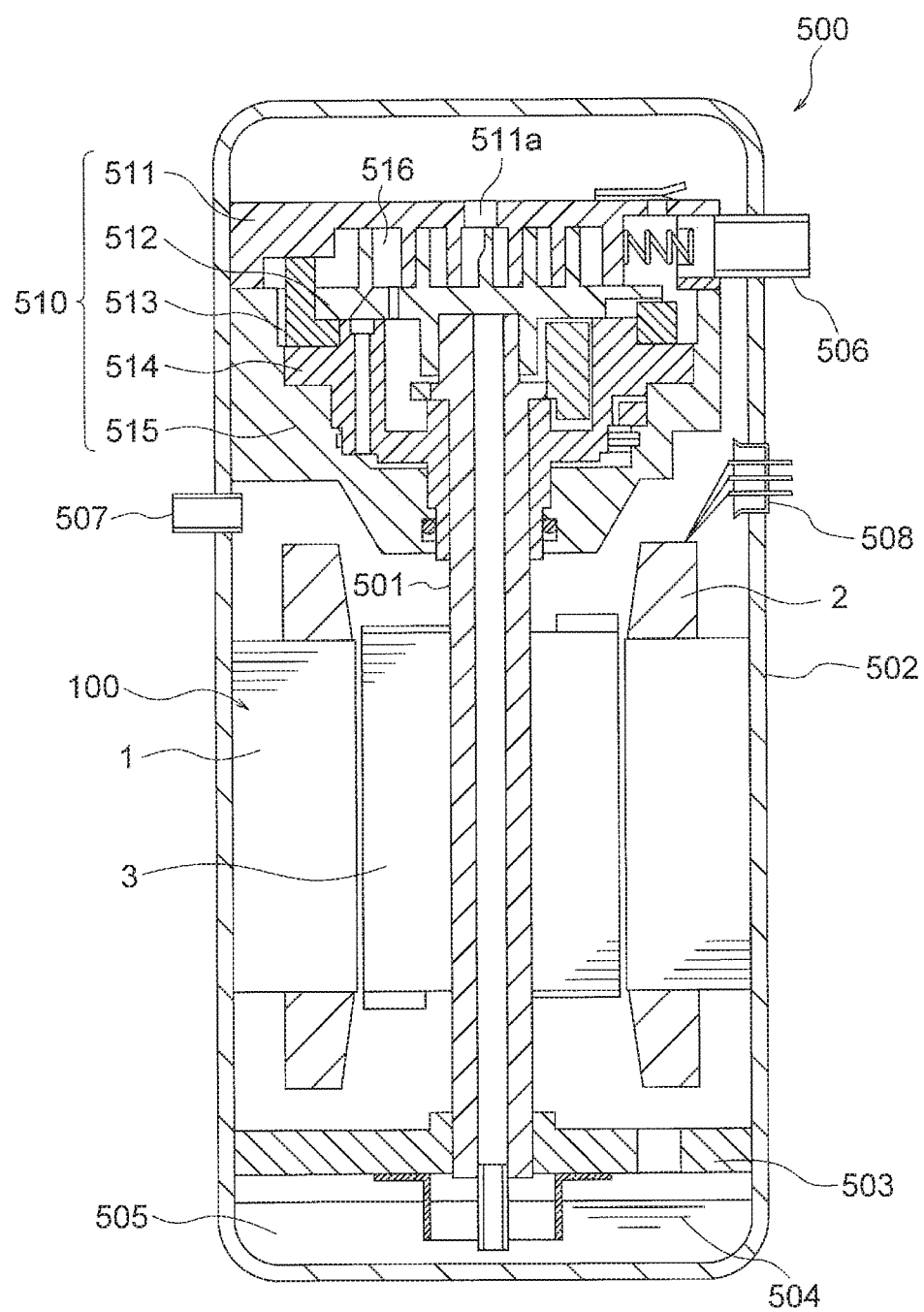
FIG. 19 is a vertical sectional view illustrating a compressor to which the motor of the first embodiment is applied.

Next, a compressor using the motor 100 of the above described first embodiment will be described. FIG. 19 is a sectional view illustrating a configuration of a compressor (scroll compressor) 500 that uses the motor 100 of the above described first embodiment.

The compressor 500 is a scroll compressor and includes, in a closed container 502, a compression mechanism 510, the motor 100 that drives the compression mechanism 510, a main shaft 501 that connects the compression mechanism 510 and the motor 100 to each other, a sub-frame 503 that supports an end (a sub-shaft part) of the main shaft 501 opposite to the compression mechanism 510, and a lubricant 504 stored in an oil reservoir 505 at a bottom of the closed container 502.

The compression mechanism 510 has a fixed scroll 511 and an orbiting scroll 512 attached to the main shaft 501. Each of the fixed scroll 511 and the orbiting scroll 512 has a spiral part, and a spiral compression chamber 516 is formed between the fixed scroll 511 and the orbiting scroll 512. The compression mechanism 510 further includes an Oldham ring 513 that regulates rotation of the orbiting scroll 512 to make the orbiting scroll 512 swing, a compliant frame 514 to which the orbiting scroll 512 is attached, and a guide frame 515 that supports these components.

A suction pipe 506 passing through the closed container 502 is press-fitted to the fixed scroll 511. Moreover, a discharge pipe 507 is provided so as to pass through the closed container 502. The discharge pipe 507 allows high-pressure refrigerant gas discharged from a discharge port 511a of the fixed scroll 511 to be discharged to the outside.

The closed container 502 includes the cylindrical shell 4 (FIG. 1). The motor 100 of the first embodiment is attached to the inner circumferential side of the shell 4. A glass terminal 508 for electrically connecting the stator 1 of the motor 100 and a driving circuit to each other is fixed to the closed container 502 by welding. The main shaft 501 is the shaft 35 of the motor 100 (FIG. 1).

An operation of the compressor 500 is as follows. When the motor 100 rotates, the main shaft 501 (the shaft 35) rotates together with the rotor 3. When the main shaft 501 rotates, the orbiting scroll 512 swings to change a volume of the compression chamber 516 between the fixed scroll 511 and the orbiting scroll 512. Thus, refrigerant gas is sucked from the suction pipe 506 into the compression chamber 516 and is compressed.

The high-pressure refrigerant gas compressed in the compression chamber 516 is discharged into the closed container 502 through the discharge port 511a of the fixed scroll 511, and is discharged to the outside through the discharge pipe 507. Moreover, part of the refrigerant gas discharged into the closed container 502 from the compression chamber 516 passes through the through holes 15 and the cutout parts 16 of the stator 1 (FIG. 1) and cools the motor 100 and the lubricant 504.

As described above, the motor 100 of the first embodiment can suppress harmonics of an induced voltage, and therefore can suppress vibration and noise during the operation of the compressor 500. Further, since the winding 2 is wound in wave winding, the motor 100 of the first embodiment provides a sufficient flow rate of refrigerant that passes through the through holes 15 and the cutout parts 16 (FIG. 1) to enhance cooling efficiency of the motor 100, and stability of the operation of the compressor 500 can be enhanced.

A motor used in the compressor 500 is not limited to the motor 100 of the first embodiment, and any of the motors 100A, 100B, 100C, and 100D (FIG. 18) of the modifications may be used. In addition, a scroll compressor has been described here as an example of a compressor. However, the motors 100 (100A to 100D) of the first embodiment and the modifications may be applied to a compressor other than the scroll compressor.

(Air Conditioner)

Figure 20:
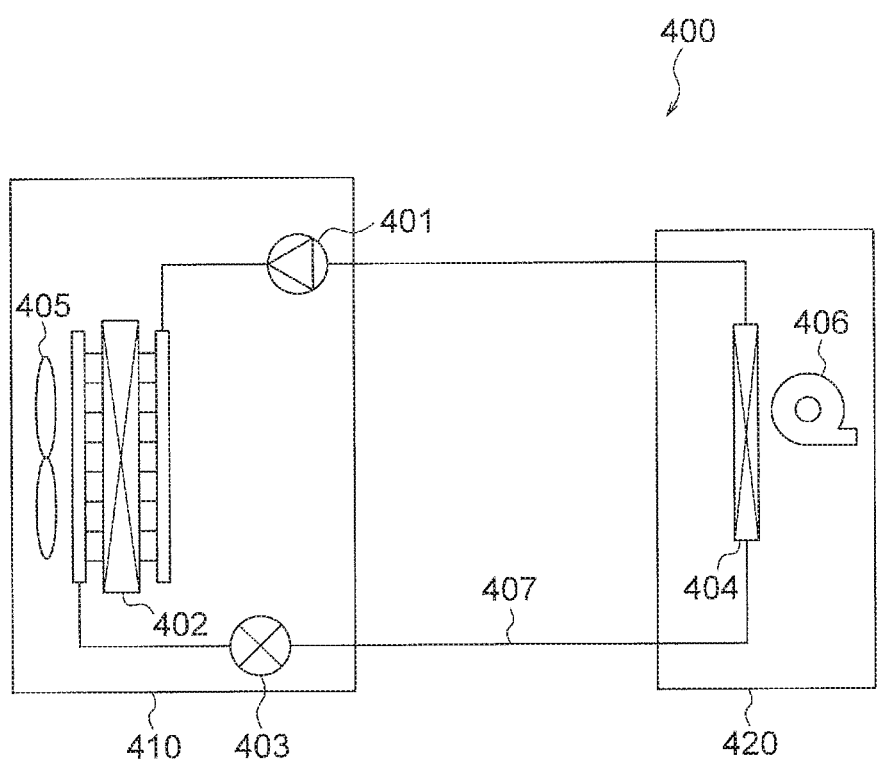
FIG. 20 is a diagram illustrating an air conditioner including the compressor of FIG. 19.

Next, an air conditioner (a refrigerating cycle apparatus) including the compressor 500 illustrated in FIG. 19 will be described. FIG. 20 is a diagram illustrating a configuration of an air conditioner 400. The air conditioner 400 illustrated in FIG. 20 includes a compressor 401, a condenser 402, a restrictor (a decompressor) 403, and an evaporator 404. The compressor 401, the condenser 402, the restrictor 403, and the evaporator 404 are connected by a refrigerant pipe 407 to constitute a refrigerating cycle. That is, refrigerant circulates through the compressor 401, the condenser 402, the restrictor 403, and the evaporator 404 in this order.

The compressor 401, the condenser 402, and the restrictor 403 are provided in an outdoor unit 410. The compressor 401 is constituted by the compressor 500 illustrated in FIG. 19. An outdoor fan 405 for supplying outdoor air to the condenser 402 is provided in the outdoor unit 410. The evaporator 404 is provided in an indoor unit 420. An indoor fan 406 for supplying indoor air to the evaporator 404 is provided in the indoor unit 420.

An operation of the air conditioner 400 is as follows. The compressor 401 compresses sucked refrigerant and sends out the compressed refrigerant. The condenser 402 exchanges heat between the refrigerant flowing from the compressor 401 and the outdoor air, condenses and liquefies the refrigerant, and sends out the liquefied refrigerant to the refrigerant pipe 407. The outdoor fan 405 supplies the outdoor air to the condenser 402. The restrictor 403 changes its opening degree to thereby adjust a pressure or the like of the refrigerant flowing through the refrigerant pipe 407.

The evaporator 404 exchanges heat between the refrigerant brought into a low pressure state by the restrictor 403 and the indoor air, causes the refrigerant to take heat from the air and evaporate (vaporize), and sends out the refrigerant to the refrigerant pipe 407. The indoor fan 406 supplies the indoor air to the evaporator 404. Thus, cool wind deprived of heat by the evaporator 404 is supplied into a room.

Since the motor 100 described in the first embodiment and the modifications is applied to the compressor 401 (the compressor 500 in FIG. 19), vibration and noise during the operation of the air conditioner 400 can be suppressed. Moreover, stability of the operation of the compressor 401 during the operation of the air conditioner 400 can be enhanced, and operation efficiency of the air conditioner 400 can be enhanced.

The compressor 500 to which any of the motors 100 (100A to 100D) of the first embodiment and the modifications is applied is not limited to use in the air conditioner 400 illustrated in FIG. 20. The compressor 500 may be used in another type of air conditioner.

Although the preferred embodiments of the present invention have been described specifically, the present invention is not limited to the above described embodiments, and various improvements or modifications can be made within a range not departing from the gist of the present invention.

What is claimed is:

1. A motor used in a compressor, comprising:
   a stator comprising:
   a stator core having a yoke part that extends in a circumferential direction about an axis and a plurality of teeth that extend from the yoke part toward the axis and are arranged in the circumferential direction, and
   a winding wound around the plurality of teeth of the stator core in wave winding; and
   a rotor whose number of poles is P and which is disposed on an inner side of the stator in a radial direction about the axis,
   wherein the stator core comprises electromagnetic steel sheets which are stacked in the direction of the axis and fixed together by crimping parts,
   wherein when a number of the plurality of teeth is represented by S, S/P≥6 is satisfied,
   wherein the yoke part has a refrigerant passage through which refrigerant passes in a direction of the axis,
   wherein the refrigerant passage has:
   a plurality of through holes passing through the yoke part in the direction of the axis, and
   a plurality of cutout parts formed on an outer circumference of the yoke part over an entire region of the yoke part in the direction of the axis, wherein the plurality of through holes and the plurality of cutout parts are alternately arranged in the circumferential direction about the axis, and wherein each of the plurality of crimping parts is formed on an inner side of the corresponding cutout part in the radial direction in the yoke part.

2. The motor according to claim 1, wherein $6 \leq S/P \leq 12$ is satisfied.

3. The motor according to claim 1, wherein the winding has a conductor on which a coating of polyesterimide or polyamideimide is formed.

4. The motor according to claim 1, wherein the stator core has a slot between two teeth of the plurality of teeth, the two teeth being adjacent to each other in the circumferential direction, and $T1 \geq (W1+W2)/4$ is satisfied, where W1 represents a width in the circumferential direction of each of the plurality of teeth at an inner end in the radial direction, W2 represents a width in the circumferential direction of each of the plurality of teeth at an outer end in the radial direction, and T1 represents a shortest distance from the slot to a nearest through hole of the plurality of through holes.

5. The motor according to claim 1, wherein each of the plurality of cutout parts has a shape such that the outer circumference of the yoke part is linearly cut, in a plane perpendicular to the axis.

6. The motor according to claim 1, wherein
the stator core is fitted into a cylindrical shell of the compressor.

7. The motor according to claim 1, wherein the rotor has a permanent magnet composed of a rare earth sintered magnet.

8. The motor according to claim 7, wherein the rotor has a rotor core having magnet insertion holes the number of which corresponds to the number of poles P.

9. A compressor comprising:
the motor according to claim 1; and
a compression mechanism driven by the motor.

10. An air conditioner comprising a compressor, a condenser, a decompressor, and an evaporator,
wherein the compressor has the motor according to claim 1 and a compression mechanism driven by the motor.

* * * * *